United States Patent
Ahuja et al.

(10) Patent No.: US 9,558,209 B2
(45) Date of Patent: *Jan. 31, 2017

(54) LOCATION INPUT MISTAKE CORRECTION

(71) Applicant: TeleCommunication Systems, Inc., Annapolis, MD (US)

(72) Inventors: Rajat Ahuja, Union City, CA (US); Ritesh Bansal, Fremont, CA (US)

(73) Assignee: Telecommunications Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,701

(22) Filed: Feb. 4, 2013

(65) Prior Publication Data

US 2013/0151512 A1 Jun. 13, 2013

Related U.S. Application Data

(63) Continuation of application No. 11/797,819, filed on May 8, 2007, now Pat. No. 8,370,339.

(60) Provisional application No. 60/798,330, filed on May 8, 2006.

(51) Int. Cl.
  *G06F 17/30* (2006.01)
  *G01C 21/20* (2006.01)
(52) U.S. Cl.
  CPC ......... *G06F 17/30241* (2013.01); *G01C 21/20* (2013.01)
(58) Field of Classification Search
  USPC .......................... 707/999.005–999.007, 724
  See application file for complete search history.

(56) References Cited

U.S. PATENT DOCUMENTS

| 5,006,837 A | 4/1991 | Bowers |
| 5,200,738 A | 4/1993 | Fumoto |
| 5,263,136 A | 11/1993 | DeAguiar |

(Continued)

FOREIGN PATENT DOCUMENTS

| WO | PCT/US00/0023 | 1/2000 |
| WO | PCT/US05/023244 | 6/2005 |
| WO | PCT/CA05/001512 | 10/2005 |

OTHER PUBLICATIONS

NENA Statement on VoIP E9-1-1 Implementation issues, National Emergency No. Association, Mar. 2006.

(Continued)

*Primary Examiner* — Bai D. Vu
(74) *Attorney, Agent, or Firm* — Tarolli, Sundeim, Covell & Tummino LLP

(57) ABSTRACT

A system for automatically correcting a mistaken geocoded location input. A wireless device such as a cell phone ranks possible location input based on edit distance, which is a 'confidence factor'. If there is no perfect match, then a list of geocode options is returned, preferably sorted by the score. The 'closeness' is derived by looking at the edit distance to go from the input to the matched address. Edit distance is defined herein as the number of insertion/deletion/replacement operations to go from input location to the possible matched location. In one embodiment, an option list, or 'pick list', may be provided based on an edit distance scoring system. The edit distance scoring system is preferably based on a number of keystrokes difference between the input location name and the possible matched location name.

8 Claims, 3 Drawing Sheets

(56) References Cited

U.S. PATENT DOCUMENTS

| | | | |
|---|---|---|---|
| 5,781,200 A | 7/1998 | Lu | |
| 5,973,700 A | 10/1999 | Taylor | |
| 6,104,416 A | 8/2000 | McGuiness | |
| 6,144,338 A | 11/2000 | Davies | |
| 6,262,741 B1 | 7/2001 | Davies | |
| 6,434,482 B1 | 8/2002 | Oshida | |
| 6,487,495 B1 | 11/2002 | Gale | |
| 6,529,143 B2 | 3/2003 | Mikkola | |
| 6,571,169 B2 | 5/2003 | Miyaki | |
| 6,587,782 B1 | 7/2003 | Nocek | |
| 6,714,205 B1 | 3/2004 | Miyahita | |
| 6,734,867 B1 | 5/2004 | Munshi | |
| 6,834,229 B2* | 12/2004 | Rafiah et al. | 701/533 |
| 6,904,176 B1 | 6/2005 | Chui | |
| 6,912,545 B1 | 6/2005 | Lundy et al. | |
| 6,940,407 B2 | 9/2005 | Miranda-Knapp | |
| 6,947,976 B1* | 9/2005 | Devitt et al. | 709/219 |
| 7,190,839 B1 | 3/2007 | Feather | |
| 7,385,600 B2 | 6/2008 | Marion | |
| 7,840,579 B2* | 11/2010 | Samuelson et al. | 707/758 |
| 2002/0067353 A1 | 6/2002 | Kenyon | |
| 2003/0011623 A1 | 1/2003 | Dermer | |
| 2003/0016804 A1 | 1/2003 | Sheha et al. | |
| 2003/0034936 A1 | 2/2003 | Ernst | |
| 2003/0137961 A1 | 7/2003 | Tsirtsis et al. | |
| 2004/0135784 A1 | 7/2004 | Cohen | |
| 2004/0158829 A1 | 8/2004 | Beresin | |
| 2004/0185870 A1 | 9/2004 | Matsuda | |
| 2004/0217980 A1 | 11/2004 | Radburn | |
| 2005/0174333 A1* | 8/2005 | Robinson et al. | 345/168 |
| 2005/0270311 A1 | 12/2005 | Rasmussen | |
| 2005/0288033 A1 | 12/2005 | McNew | |
| 2005/0289141 A1* | 12/2005 | Baluja | 707/6 |
| 2006/0005114 A1 | 1/2006 | Williamson | |
| 2006/0023626 A1 | 2/2006 | Krausz | |
| 2006/0055693 A1 | 3/2006 | Sylthe | |
| 2006/0058943 A1* | 3/2006 | Pascual et al. | 701/200 |
| 2006/0176283 A1* | 8/2006 | Suraqui | 345/169 |
| 2006/0224997 A1 | 10/2006 | Wong | |
| 2006/0246922 A1 | 11/2006 | Gasbarro | |
| 2006/0256130 A1 | 11/2006 | Gonzalez | |
| 2007/0041513 A1 | 2/2007 | Gende | |
| 2007/0072620 A1 | 3/2007 | Levitan | |
| 2007/0149243 A1 | 6/2007 | Hwang | |
| 2008/0104227 A1* | 5/2008 | Birnie et al. | 709/224 |

OTHER PUBLICATIONS

Internal Search Report received in PCT/US2007/11027 dated Oct. 23, 2008.

European Search Report received in European Appl. No. 07794624.2 dated Jun. 17, 2010.

Internal Search Report received in PCT/US2007/10542 dated Nov. 26, 2008.

* cited by examiner

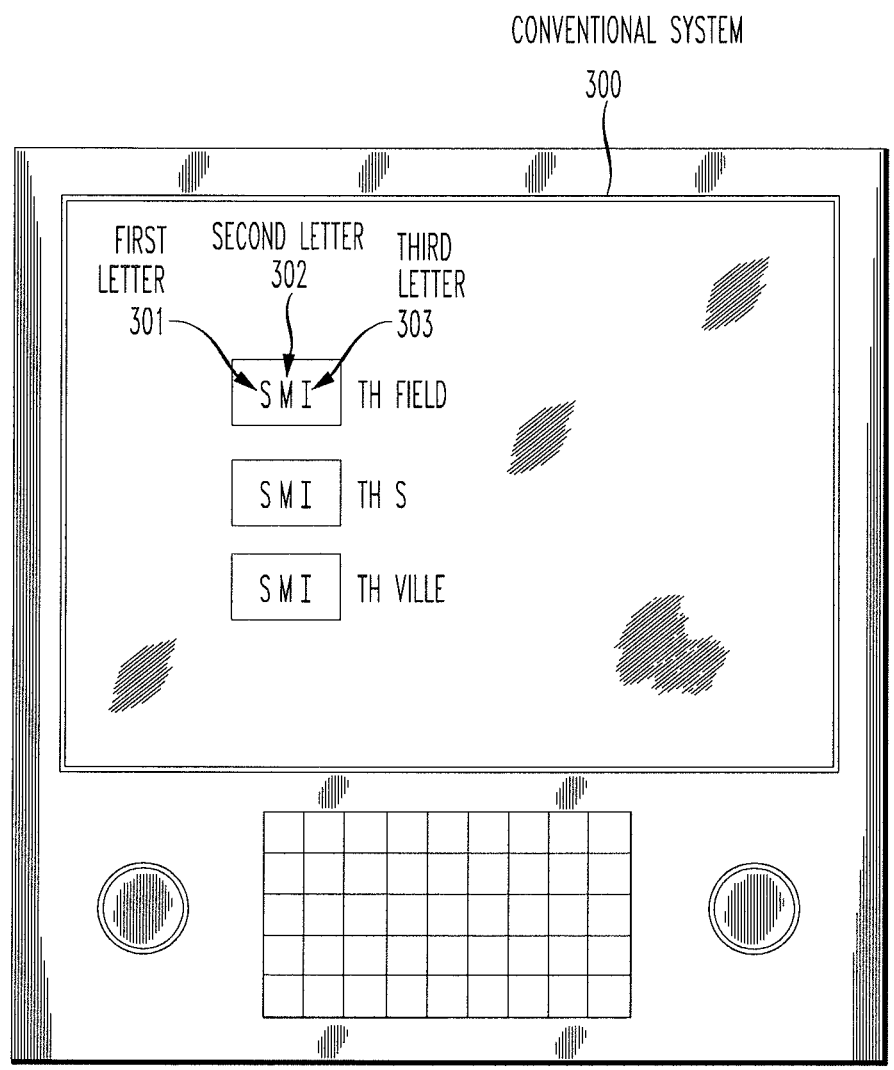

LOCATION INPUT MISTAKE CORRECTION

The present application is a continuation of U.S. application. Ser. No. 11/797,819, entitled "Location Input Mistake Correction", filed on May 8, 2007, now U.S. Pat. No. 8,370,339; which claims priority from U.S. Provisional Application No. 60/798,330, entitled "Location Input Mistake Correction" to Ahuja et al., filed May 8, 2006, the entirety of both of which are expressly incorporated herein by reference.

BACKGROUND OF THE INVENTION

1. Field of the Invention

The present invention relates generally to wireless and long distance carriers, Internet Service Providers (ISPs), and information content delivery services/providers and long distance carriers. More particularly, it relates to location based services, and most particularly to navigation using location based services.

2. Background of the Related Art

The demand for wireless communication services are ever increasing in response to a society that is becoming increasingly mobile. As a result, wireless devices, and in particular cell phones, have become ubiquitous with day-to-day life. A majority of people in the United States now own cell phones.

Location services are a more recent advanced feature made available for use with wireless devices, perhaps most notably to provide location of a cell phone. The general goal of location-based services is to automatically provide location-based information to a requesting application. The requesting application may be operating on the wireless device itself, or even on an external application running, e.g., on another device in the wireless or other network. Some exemplary applications that use location services include mapping applications that show interesting places in a vicinity of the wireless device's current global position, and navigation from a current location. Location based services are available for wireless devices such as personal digital assistants (PDAs) as well as for cell phones.

A geospatial entity object code (Geocode) is code that represents a geospatial coordinate measurement of an exact geographic location on (or above, or below) the earth. Many location-based applications on current wireless phones allow a user of the wireless phone to manually input a geocode location, and get in response a location based service, e.g., navigation to a desired destination.

A geocoded representation is derived from latitude, longitude, altitude, date, local time, global time, and other geospatial attributes, e.g., how the area is coded (number, letter, mixture of both, other); which part of the earth is covered (whole earth, land, water, a continent, a country); what kind of area or location is coded (country, county, airport, railstation, city); and/or whether an area or a point is coded.

In practice, a geocoded location may be entered by the name of the location. While entry of a location name is much more user-friendly than an all-natural numerical input relating to latitude, longitude, etc., it is subject to error when input by the user.

FIG. 3 shows a conventional system for assisting a user manually inputting a location name.

In particular, as shown in FIG. 3, a user manually inputs a first letter 301, then a second letter 302, then a third letter 303 of a location name. The conventional system provides possible matches to the first three sequential letters entered by the user, typically presented in alphabetical order.

The conventional system aims to shorten a user's need to enter all letters of a given location name. However, if the user doesn't know how to properly spell the location, particularly in the earliest letters in the location name, the conventional system will not be able to present the user with a small, focused list from which to choose a location. Moreover, if the user has misspelled any letter in the location name, conventional systems quite simply will in fact exclude, rather than include, the intended location name. Furthermore, even with the conventional system aimed at assisting a user to input a geocoded location correctly in the first place, the conventional system has no way of automatically correcting a mistaken geocode once it is entered by the user.

There is a need for an improved location input technique on a wireless phone.

SUMMARY OF THE INVENTION

In accordance with the principles of the invention, a method and apparatus for automatically correcting an input location including a typographical mistake comprises comparing an input location parameter to a plurality of possible location parameter matches. The plurality of possible location parameter matches are ranked based on edit distance between the input location parameter and the possible location parameter. A best ranked one of the plurality of possible location parameters is provided as a correction to the input location parameter.

BRIEF DESCRIPTION OF THE DRAWINGS

Features and advantages of the present invention will become apparent to those skilled in the art from the following description with reference to the drawings, in which:

FIG. 3 shows a conventional system for assisting a user manually inputting a location name.

DETAILED DESCRIPTION OF ILLUSTRATIVE EMBODIMENTS

The invention relates to manual or semi-manual input of a geocode location. The present inventors have realized that a geocode location is subject to erroneous manual input by the user, particularly using the keypad of a typical wireless phone. If the user makes a mistake during manual input of a location name, the geocode will likely fail and an error message would be generated. This wastes network resources, not to mention the user's time.

Existing technology does not automatically fix spelling mistakes in geocode location input. Conventional systems may give a user locations matching the contiguous letters entered to that point by the user, but the user must spell the beginning few or more letters of the location correctly to narrow the field of possible choices for location, which may be presented to the user. However, the existing technology is disadvantageous because a user unsure of the spelling of the beginning of a given location's name may be unable to manually enter a location.

Figure 1:
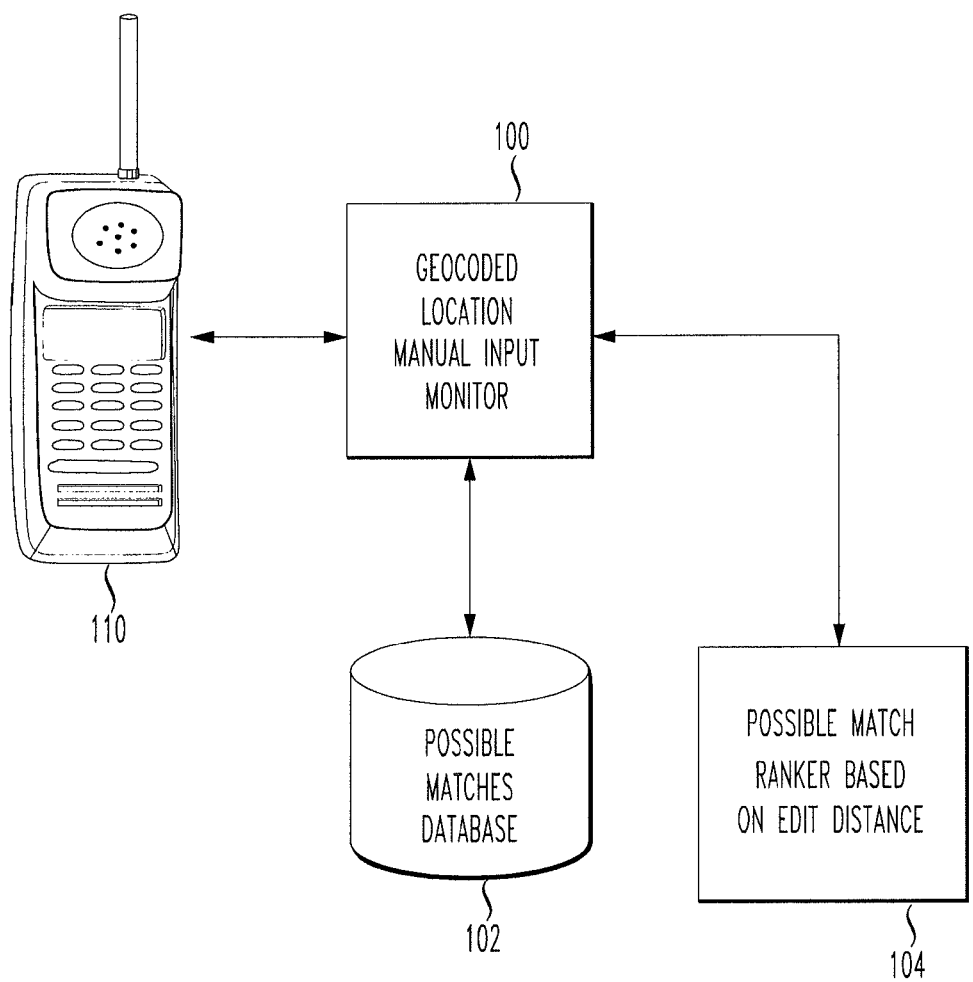
FIG. 1 shows a system for automatically correcting a mistaken geocoded location name input, in accordance with the principles of the present invention.

FIG. 1 shows a system for automatically correcting a mistaken geocoded location name input, in accordance with the principles of the present invention.

In particular, as shown in FIG. 1, a wireless device such as a cell phone 110 includes a geocoded location manual input monitor 100, a database of possible location matches 102, and a possible match ranker that ranks possible location input based on edit distance 104.

Preferably the geocoded location manual input monitor 100, possible matches database 102, and/or possible match ranker based on edit distance module 104 are resident in the wireless device 100. However, any or all of these elements 100-104 may be alternatively located in a central location, e.g., in a server at the wireless base station in communication with the wireless device 100.

In accordance with the principles of the present invention, the geocoded location manual input monitor 100 looks for a best match for location input based on edit distance from possible matches in the possible matches database 102. Edit distance ranks correction options based on a 'confidence factor'.

In accordance with the principles of the present invention, given a geocode location/address input, the geocoding indices are searched for close matches. All the 'closely' matching entries are evaluated for their closeness to the input, thereby giving a 'confidence factor' or score. If there is no perfect match, then we return a list of geocode options sorted by the score. The 'closeness' is derived by looking at the edit distance to go from the input to the matched address.

Edit distance is defined herein as the number of insertion/deletion/replacement operations to go from input location to the possible matched location. In one embodiment, an option list, or 'pick list', may be provided based on an edit distance scoring system. The edit distance scoring system is preferably based on a number of keystrokes difference between the input location name and the possible matched location name.

For example, a user might intend to input "Maine", but instead incorrectly inputs "Main". The edit distance between the input "Maine" and the possible match "Main", "Main" vs the correct "Maine", is 1 deletion, or 1 keystroke score.

Using the edit distance scoring system, there are three (3) types of keystroke mistakes: an insertion mistake, a deletion mistake, and a replacement of character mistake. In the disclosed embodiments all types of mistakes are ranked equally. It is within the principles of the invention to score the types of mistakes differently. A difference in the type of scoring may be determined empirically.

Automatic correction of an input location may be determined based on various elements of the input location name. For instance, a geocoded location may be input not by name (or in addition to name), but instead by another identifying parameter, e.g., on:

street prefix,
street base name,
street type,
street suffix, and/or
city.

Figure 2:
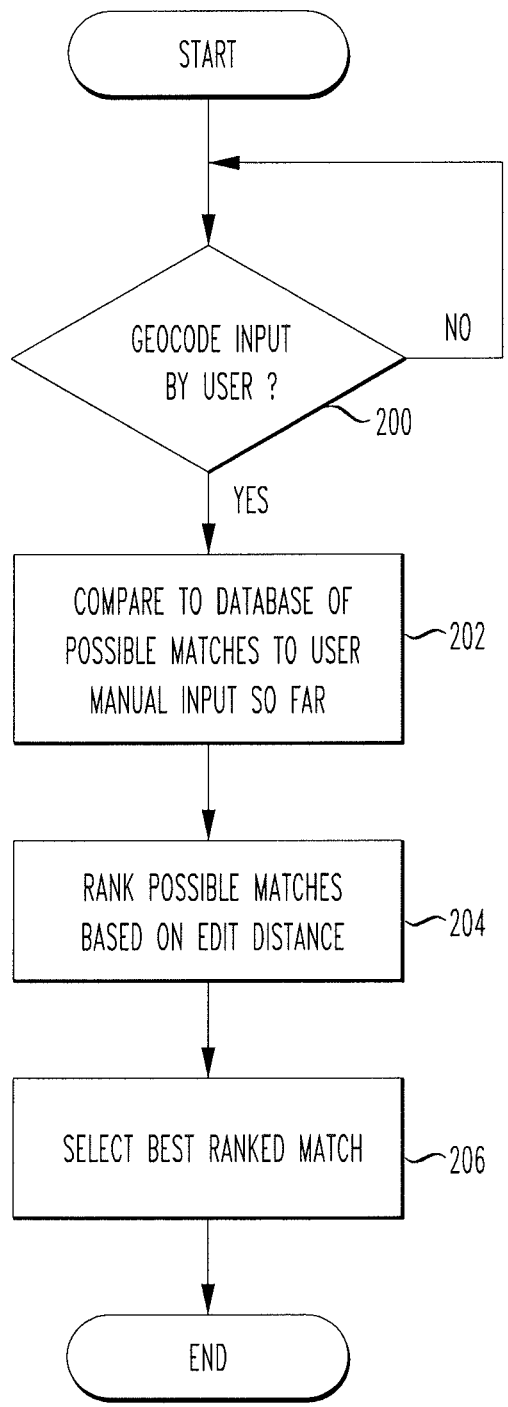
FIG. 2 shows an exemplary method of automatically correcting a mistaken geocoded location name input, in accordance with the principles of the present invention.

FIG. 2 shows an exemplary method of automatically correcting a mistaken geocoded location name input, in accordance with the principles of the present invention.

In particular, as shown in step 200 of FIG. 2, a user inputs a geocoded location into their wireless device.

In step 202, the user's manual input is compared to the entries in the possible match database 102.

In step 204, entries in the possible match database 102 are ranked based on edit distance to what the user input.

In step 206, the best ranked match is selected, and presented as the input geocoded location. Preferably the 'best' ranked match is that which has the highest numerical ranking based on edit distance to entries in the possible matches database 102.

If the user input a correctly spelled location in the first place, the best ranked match, and the highest scoring match with no errors, would be the correct location.

The invention has particular applicability to use in cell phones and other wireless devices.

While the invention has been described with reference to the exemplary embodiments thereof, those skilled in the art will be able to make various modifications to the described embodiments of the invention without departing from the true spirit and scope of the invention.

What is claimed is:

1. A method of correcting an input location parameter, comprising:
    comparing an input location parameter, formulated by a physical device, to a plurality of inexactly matching location parameters;
    ranking said plurality of possible inexactly matching location parameters based on an edit distance between said input location parameter, and each of said plurality of inexactly matching location parameters, wherein each edit distance characterizes a total number of keystroke differences between said input location parameter and a corresponding one of said plurality of inexactly matching location parameters; and
    providing, to said physical device, a best ranked one of said plurality of inexactly matching location parameters based on a geographic proximity between a location represented by said best ranked one of said plurality of inexactly matching location parameters, and a current location of said physical device;
    wherein said input location parameter includes a street base name associated with a point of interest.

2. The method of correcting an input location parameter according to claim 1, wherein:
    said input location parameter is a geographic search parameter.

3. The method of correcting an input location parameter result according to claim 1, wherein:
    said input location parameter further includes a name of said point of interest.

4. The method of correcting an input location parameter result according to claim 1, wherein:
    said input location parameter further includes a street prefix associated with said point of interest.

5. The method of correcting an input location parameter according to claim 1, wherein:
    said input location parameter further includes a street type of a name associated with said point of interest.

6. The method of correcting an input location parameter according to claim 1, wherein:
    said input location parameter further includes a street suffix of a name associated with said point of interest.

7. The method of correcting an input location parameter according to claim 1, wherein:
    said input location parameter further includes a city name of a name associated with said point of interest.

8. The method of correcting an input location parameter according to claim 1, wherein:

each keystroke difference of each edit distance defines one of an insertion mistake, a deletion mistake and a replacement of character mistake.

* * * * *